United States Patent [19]
Cole

[11] Patent Number: 5,956,344
[45] Date of Patent: Sep. 21, 1999

[54] INTERPROCESSOR COMMUNICATIONS IN AN ATM ENVIRONMENT

[75] Inventor: Steven R. Cole, San Jose, Calif.

[73] Assignee: Siemens Information and Communication Networks, Inc., Boca Raton, Fla.

[21] Appl. No.: 08/794,300

[22] Filed: Feb. 3, 1997

[51] Int. Cl.$^6$ .................................. H04J 3/16; H04J 3/22; H04J 3/24

[52] U.S. Cl. ............................ 370/465; 370/474; 370/395

[58] Field of Search ...................................... 370/400, 395, 370/398, 463, 465, 466, 467, 474, 475; 395/800.32, 800.34, 800.41, 285, 309, 286, 527, 200.57, 200.6, 681, 682, 683, 684, 685, 500.44, 500.45, 500.46, 500.47, 500.48, 500.49; 710/105, 106, 131, 129

[56] References Cited

U.S. PATENT DOCUMENTS

| | | | |
|---|---|---|---|
| 5,490,141 | 2/1996 | Lai et al. | 370/395 |
| 5,708,659 | 1/1998 | Rostoker et al. | 370/466 |

*Primary Examiner*—Chi H. Pham
*Assistant Examiner*—Steven Nguyen

[57] ABSTRACT

A method and system of enabling intra-system communication between first and second microprocessors in an asynchronous transfer mode (ATM) environment includes emulating ATM segmentation and reassembly at the first microprocessor. The second microprocessor is connected to circuitry for supporting ATM communications with other systems. With respect to an inter-processor communication (IPC) from the first microprocessor to the second microprocessor, conventional ATM segmentation is emulated at the first microprocessor, thereby forming fixed-length cells having payloads representative of the IPC. ATM-compatible header information is attached to each one of the cells and transferred to the circuitry, which typically includes a segmentation and reassembly (SAR) device. The circuitry reassembles the message and forwards the IPC to the second microprocessor. With respect to an IPC directed from the second microprocessor to the first microprocessor, the message is segmented at the circuitry to form fixed-length cells having payloads representative of the message. ATM-compatible header information identifying the first microprocessor as the destination is attached to each of the cells. The cells are then transferred to the first microprocessor, where conventional ATM reassembly of the message is emulated.

19 Claims, 7 Drawing Sheets

FIG. 1

FIG_2

FIG_3

FIG_4

FIG_5

FIG_6

FIG_7

FIG_8

FIG_9

INTERPROCESSOR COMMUNICATIONS IN AN ATM ENVIRONMENT

BACKGROUND OF THE INVENTION

The invention relates generally to systems having more than one microprocessor and more particularly to methods for enabling intra-system communication between two processors.

Description of the Related Art

Many systems utilize more than one microprocessor in order to operate efficiently. Each of the processors may execute a different task, so that the tasks are performed simultaneously, rather than sequentially. Intra-system communications between processors allow cooperation in completing operations in substantially less time than would be required if a single processor were used. The architecture will vary depending upon the application.

Two types of architectures that are used in systems having more than one microprocessor may be referred to as a shared-memory multiprocessor architecture and a distributed-memory multiprocessor architecture. Inter-processor communications in the shared-memory architecture are achieved by means of shared, multi-port memory devices. A memory device is partitioned into separate modules, allowing the different processors to access the memory simultaneously. For inter-processor communications, a sending processor may store a message in memory and notify a destination processor of the memory address of the message. The destination processor may then fetch the message stored at that address. The message may be data or an instruction. A concern with this type of architecture is that the memory devices that allow the inter-processor communications may add significantly to the cost of the system. Another concern is that the architecture increases the hardware real estate requirements at the board level of the system.

Within the distributed-memory multiprocessor architecture, inter-processor communications are executed by passing messages. Each processor is equipped with its own local memory. The messages are sent from one processor to the local memory of the destination processor. The destination processor then accesses the message by accessing its own memory. The exchange of messages requires at least one data communication interface, such as a high-level data link control (HDLC) interface. This may significantly increase the cost, board real estate requirements, and power consumption of the system. U.S. Pat. No. 5,550,978 to Takahashi et al. describes a multiprocessor system having interfaces that allow communications between numerous processors. Each processor of the system has an interface for connecting in parallel to each of a number of asynchronous transfer mode (ATM) switches. Each interface splits a transmission data block into an array of bit data blocks. The interface converts the bit data blocks (e.g., messages) into cells by adding a header that includes the routing information to a destination processor. The interface then sends the cells in parallel to an array of ATM switches. The cells are transferred in parallel to the destination processor or processors by the ATM switches. The cells are then reassembled into the original data block at the interface of the destination processor.

The multiprocessor system of Takahashi et al. operates well for its intended purpose. However, the inter-processor communication technique requires a one-to-one correspondence between the processors and the interfaces. Moreover, an array of ATM switches is required. The number of ATM switches corresponds to the bit width of the internal buses of the processors. As previously noted, the required components add significantly to the cost, size and power consumption of the system.

What is needed is a system and method for enabling intra-system communication between two or more processors without adversely affecting other system-design concerns, such as providing a low power, low cost multiprocessor system.

SUMMARY OF THE INVENTION

A method of enabling intra-system communication between first and second processors of a system includes enabling the first processor to emulate asynchronous transfer mode (ATM) segmentation of outgoing messages into ATM cells directed toward the second processor and to emulate ATM reassembly of cells into an incoming message received from the second processor. In a preferred embodiment, the system includes ATM circuitry accessible by the second processor for supporting ATM communications with a remote device or system.

With respect to a message directed from the first processor to the second processor, the first processor emulates ATM segmentation of the message to form cells having payloads representative of the message. ATM-compatible header information is attached to each cell. The cells are then transferred to the ATM circuitry accessible by the second processor. The cells are reassembled and forwarded to the second processor in a manner conventional to ATM networking. Thus, the ATM circuitry associated with the second processor preferably includes a conventional segmentation and reassembly (SAR) device.

With respect to messages directed from the second processor to the first processor, the ATM circuitry segments the message to form cells having payloads representative of the message. Again, the processing at the ATM circuitry may be executed in a conventional manner utilizing conventional ATM circuitry, including a SAR device. The appropriate header information is attached to each cell and transferred to the first processor. The first processor emulates ATM reassembly to form the first message.

In the preferred embodiment, the system supports ATM communications with remote systems. Such communications are provided via the second processor and the circuitry associated with the second processor. Consequently, the inter-processor communication is achieved using pre-existing circuitry.

DETAILED DESCRIPTION

Figure 1:
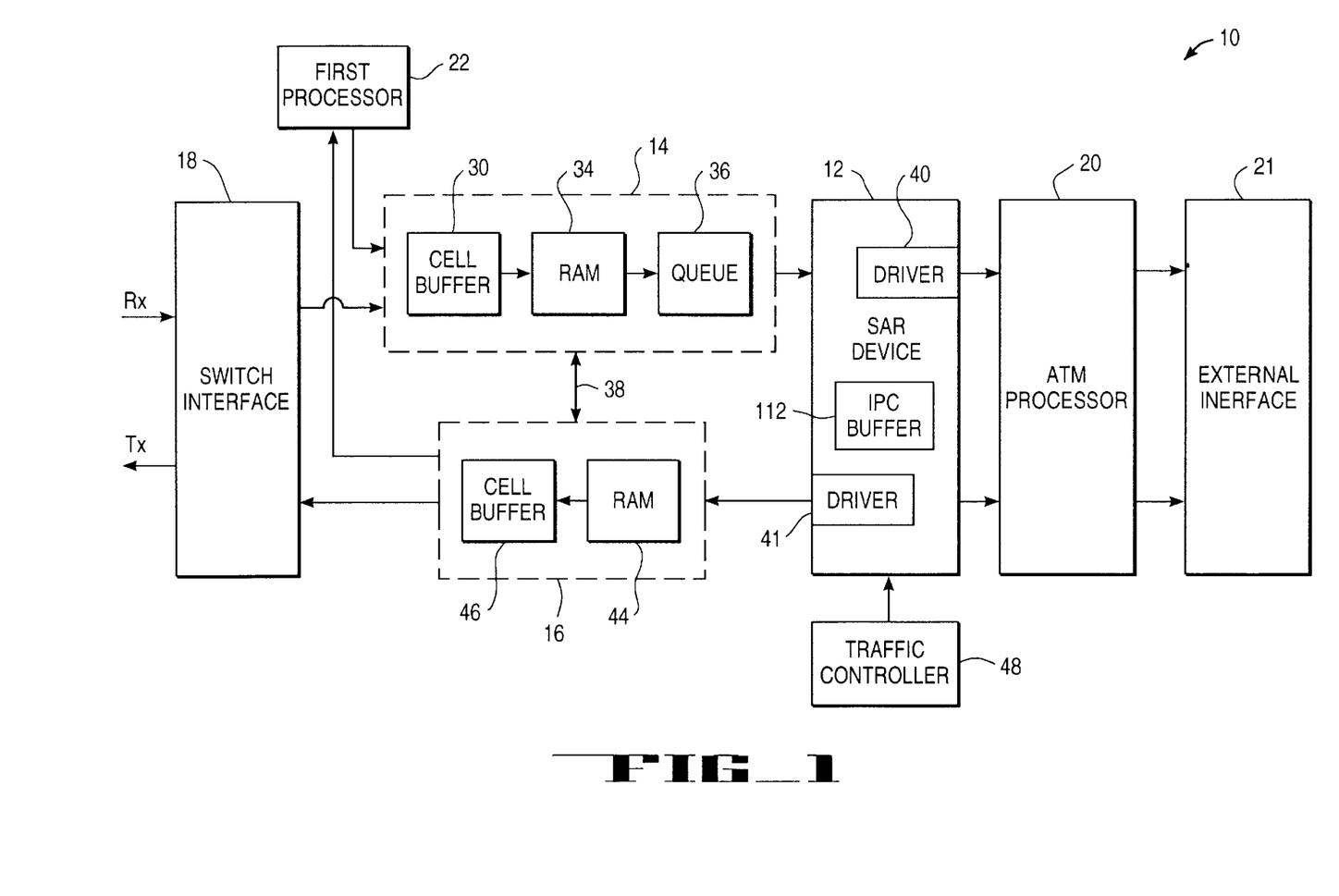
FIG. 1 is a block diagram of an ATM system having two processors connected to allow inter-processor communication in accordance with the invention.

With reference to FIG. 1, a system 10 that supports both intra-system ATM communications and inter-system ATM communications is shown as including many of the conventional components for implementing the functions of the three layers of the ATM standard, i.e., the ATM Adaption Layer (AAL), the ATM Layer and the Physical Layer. As is known in the art, the AAL is the highest layer in the system architecture. The AAL divides outgoing messages into packets of 48-byte lengths. Header information is attached to the packets to form fixed-length cells of 53 bytes. Most of the 48 bytes comprise the message, but a portion may be processing information in addition to the 5-byte header information. For example, the 48-byte packet may include the 6-bit length indicator (LI). The AAL also reassembles messages from incoming 53-byte cells. The functions of the AAL for inter-system communications may be executed within a segmentation and reassembly (SAR) device 12, or may be implemented in a combination of the SAR device and a pair of processing units 14 and 16.

The ATM Layer is the second layer of the protocol stack model. The primary function of the second layer is to process the ATM cells, but the layer also functions to support the quality of service (QoS) classes. In one embodiment of the system 10 of FIG. 1, the functions of the ATM layer for inter-system communications are executed at the processing units 14 and 16. In another embodiment, the functions of the AAL and the ATM layer are all executed at the SAR device 12.

The physical layer is at the bottom of the protocol stack model. The physical layer provides the cell transmission over the physical interfaces that connect ATM systems. With regard to the invention, the physical layer is the least significant of the three layers.

In the preferred embodiment of the method of achieving inter-processor communication, the SAR device 12 and the processing units 14 and 16 are pre-existing board-level components for supporting ATM transmissions to and from a second processor 20. The first and second processors 20 and 22 operate in co-ordination to control ATM processing. The components of system 10 may be components on one circuit board of a larger system having an array of such circuit boards. For example, the system may be one interface board of an ATM switch, with the processing units 14 and 16 being utilized for internal routing via an ATM switch interface 18. An external interface 21 provides the means for communicating with remote devices and systems, not shown. In this embodiment, the exchange of messages between the second processor 20 and a first processor 22 is achieved without requiring additional hardware. Instead, the first processor 22 is "equipped" with a software driver that is used to emulate ATM segmentation of an outgoing message into cells and reassembly of incoming cells into a message, as will be explained fully below.

If the components of FIG. 1 are contained on a conventional interface board (i.e., an I/O module) of an ATM system, the processor 20 may be an i960 RISC processor, but this is not critical. The i960 processor has an operating speed of 33 MHz. Similar to the second processor 20, the specific processor used for the first processor 22 is not critical. An acceptable device is a 386EX having a processing speed of 16 MHz. The types of messages exchanged between the processors 20 and 22 are not critical to the invention. For example, the messages may be exchanges of data or instructions. A message from the first processor to the second processor may be configuration data for a frame relay (FR) stack, connection setup data, or code downloading when the system is off-line. Examples of messages from the second processor 20 to the first processor 22 include management information base (MIB) update data, statistic data regarding an FR link, error data regarding the FR link, and signaling messages sent in both directions to support switched virtual connections (SVC).

With regard to the exchange of messages between the second processor 20 and an ATM switch or a remote system, there is no difference between the system 10 and conventional systems. Therefore, the inter-system transmissions will not be described. On the other hand intra-system communications will be outlined with reference to FIGS. 1 and 2. A more detailed description of one embodiment of the intra-system communications then follows with reference to FIGS. 3–9.

Figure 2:
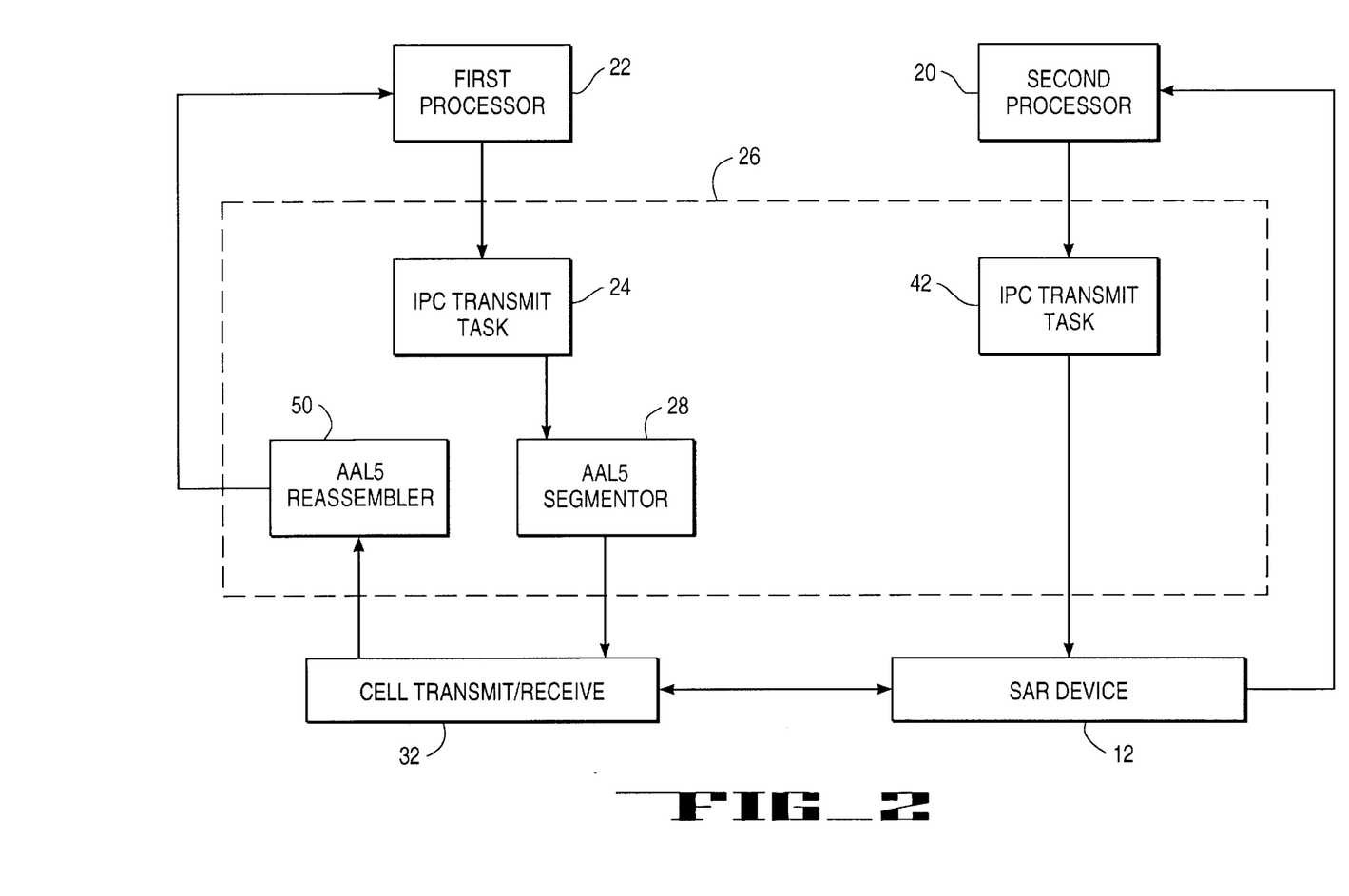
FIG. 2 is a block diagram of the software/hardware protocol stack for inter-processor communication in FIG. 1.

Referring to FIGS. 1 and 2, in order to send a message from the first processor 22 to the second processor 20, a processing task at the first processor sends the message to an inter-processor communication (IPC) transmit task 24. In FIG. 2, the area within dashed lines 26 represents processing that is carried out in software. The inter-processor communication may be executed without the addition of any extra hardware. Only an additional software driver is required to enable the inter-processor communications. The software driver enables emulation of ATM segmentation and reassembly of messages from and to the first processor 22. The IPC transmit task 24 forwards the message to the segmentor portion 28 of the software driver. In the embodiment of FIG. 2, the segmentor portion is identified as an AAL Type 5 segmentor. However, other types of AAL may be used with the invention.

Conventional segmentation is executed in software by the AAL5 segmentor 28. ATM header information having a predefined combination of VPI/VCI (i.e., Virtual Path Identifier/Virtual Channel Identifier) is then attached to each cell in order to identify the destination of the cell as the second processor 20.

The IPC transmit task 24 sends the individual 53-byte cells to a cell buffer 30 of the processing unit 14. In FIG. 2, the two processing units 14 and 16 are represented by a single transmit/receive device 32. As the cells are received at the processing unit 14, the cells are copied into an internal cell RAM 34 for forwarding to an outgoing queue 36 that transmits the cells to the SAR device 12. Conventionally, cells within the cell buffer 30 have the lowest priority with respect to a write into the internal cell RAM 34. Within each internal cell cycle (e.g., 2.4691 $\mu$s) there are normally four write accesses to the internal cell RAM. Among the first priority are write accesses from the switch interface 18, from the internal cell RAM itself, and from the other processing unit 16 via a cross channel 38. The second priority is the scan algorithm of the processing unit 14. The scan algorithm determines whether there are any Operations and Management (OAM) cells waiting to be inserted into the outgoing data stream from the processing unit 14. The lowest priority is the write from the cell buffer 30. However, because there are no cells being sent from the second processing unit 16 to the first processing unit 14 via the cross channel 38 and there are no OAM cells inserted by the first processing unit to send to the switch interface 18, the priority of the write from the cell buffer 30 becomes the highest available priority. This allows one cell to be sent to the internal RAM 34 within each internal cell cycle.

After the individual cells have been forwarded from the outgoing queue 36 to the SAR device 12, the message is reassembled into its original message format. The operation of the SAR device is well known in the art. A driver 40 of the SAR device 12 sends the reassembled message to the second processor 20.

Referring specifically to FIG. 2, in the reverse direction, the second processor 20 includes a second IPC transmit task 42 for directing messages from the second processor to the first processor 22. The message is copied into a SAR segmentation ring entry of the SAR device 12. The SAR device uses well known techniques for segmenting the message into 53-byte cells having header information that identify the first processor as the destination. In FIG. 2, the cells are AAL5 cells.

As shown in FIG. 1, a driver 41 of the SAR device 12 sends the cells having the predefined VPI/VCI to the second processing unit 16. An internal RAM 44 passes the cells to a cell buffer 46. The second processing unit 16 is programmed to capture all incoming cells having the predefined VPI/VCI. However, the cell buffer 46 may have limited capacity, e.g., the cell buffer may only be able to hold two cells. Consequently, a traffic controller 48 is used to regulate the speed of cell exchange. This is particularly important if the first processor 22 has an operating speed that is different than the second processor 20. For example, an i960 processor may be used as the second processor and a 386EX may be used as the first processor 22. The i960 has an operating speed of 33 MHz, while the 386EX has an operating speed of 16 MHz. In the case of a relatively long IPC message (e.g., 10 cells long), the cell buffer 46 may reach its capacity while the driver 41 continues to send cells. This overflow concern can be avoided by using the traffic controller 48 to regulate the segmentation rate of the IPC message. For example with a 386EX that can process cells at a rate of 2 Mb/s, the segmentation rate of the SAR device 12 may be set to 2 Mb/s or slower by the traffic controller 48. Optionally, the traffic controller may be a built-in traffic shaping feature of the SAR device.

Referring again to FIG. 1, after the cells of the segmented message have been captured at the cell buffer 46, the software driver emulates ATM cell reassembly. In FIG. 2, the reassembler 50 is shown as being an AAL5 reassembler, but other AAL types may be emulated. The reassembly returns the message to its original format and passes the message to the appropriate processing task of the first processor 22.

Figure 3:
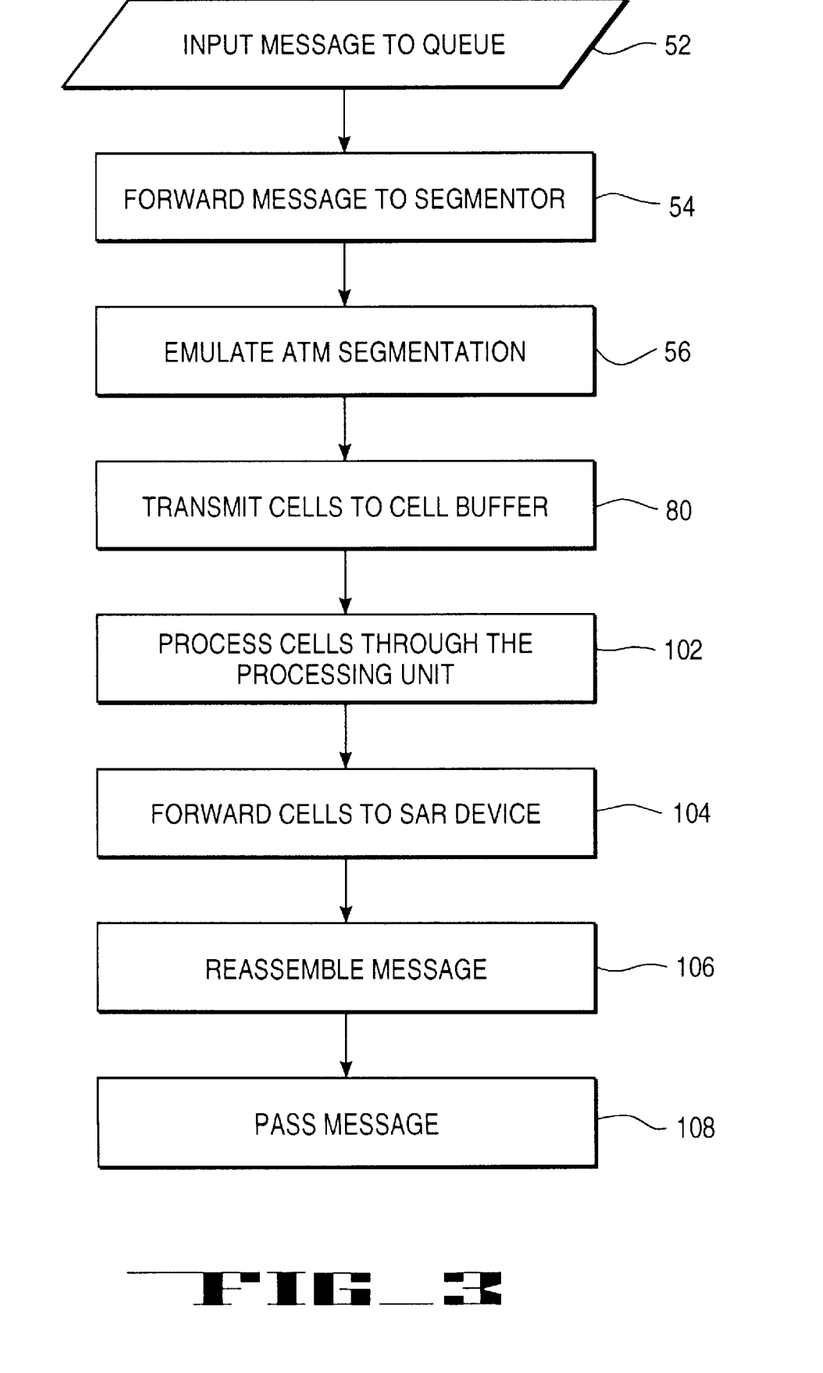
FIG. 3 illustrates the process flow of an inter-processor communication (IPC) from the first processor shown in FIGS. 1 and 2 to the second processor.

The process of transmitting a message from the first processor 22 to the second processor 20 is described in greater detail with reference to FIGS. 3–6. In FIG. 3, step 52 inputs the message to a received message queue of the IPC transmit task 24 described with reference to FIG. 2. The IPC transmit task is programmed to periodically scan its received message queue. When a message is detected, the message is forwarded to the AAL5 segmentor 28 of FIG. 2. This step is shown as step 54 in FIG. 3. The content of the message is not critical to the invention. The message may be an instruction or may be data. For example, the message may be configuration data for a frame relay stack, connection setup data, or code downloading when the system is off-line.

Figure 4:
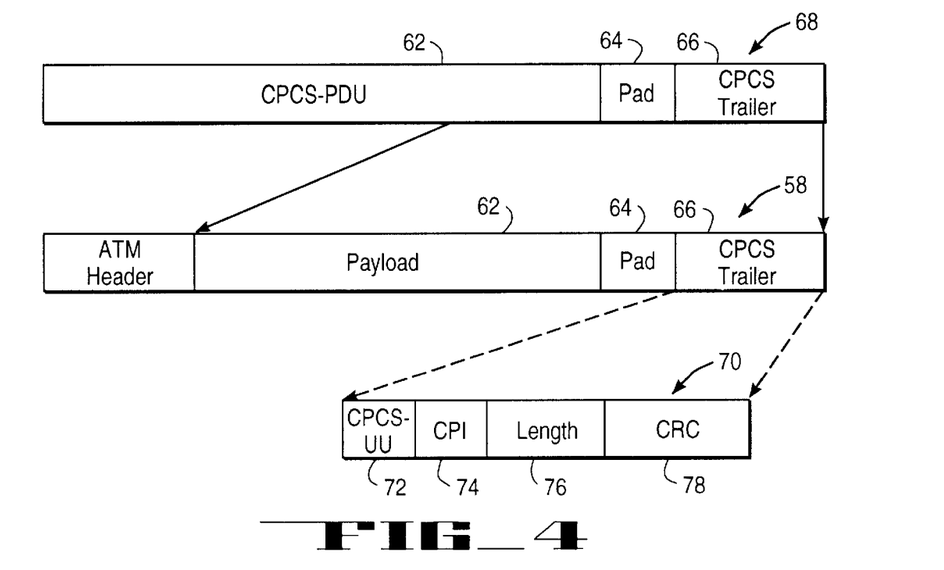
FIG. 4 illustrates the cell structure of one of the cells formed during the process illustrated in FIG. 3.

In step 56, the segmentor 28 emulates ATM segmentation. That is, the message is divided into packets of 48 bytes. The 48 bytes of a packet include a message and some header information that is different than the ATM header information that is attached to each packet to form cells of 53 bytes. As previously noted, the invention may be implemented using AAL5 techniques. An AAL5 cell 58 is shown in FIG. 4. The cell includes a standard 5-byte header 60, a payload 62, a pad 64, and a Common Part Convergence Sublayer (CPCS) trailer 66. The 48-byte packet that is used to form the 53-byte cell is shown as 68 in FIG. 4. Information within the pad 64 is standard and is well known in the art. The CPCS-PDU (Protocol Data Unit) represents the message. Also shown in FIG. 4 is the CPCS trailer information 70. The trailer information includes a standard CPCS-UU 72, a CPI 74 (i.e., a Common Part Indicator) that indicates the number of bits that a buffer allocation size field occupies), a length indicator 76 that identifies the number of bytes in the PDU that contain CPCS information, and a CRC 78 (Cyclic Redundancy Check).

Referring to FIGS. 3 and 4, in the step 56 of emulating ATM segmentation, the segmentor calculates the number of bytes in the pad 64 and the value of CRC 78. The segmentor then transmits the ATM header 60 and a 48-byte packet to the cell buffer 30 of the first processing unit 14 in FIG. 1. The 53-byte cells are transmitted to the cell buffer in one-by-one fashion until the entire CPCS-PDU is sent. This is shown as step 80 in FIG. 3.

Figure 5:
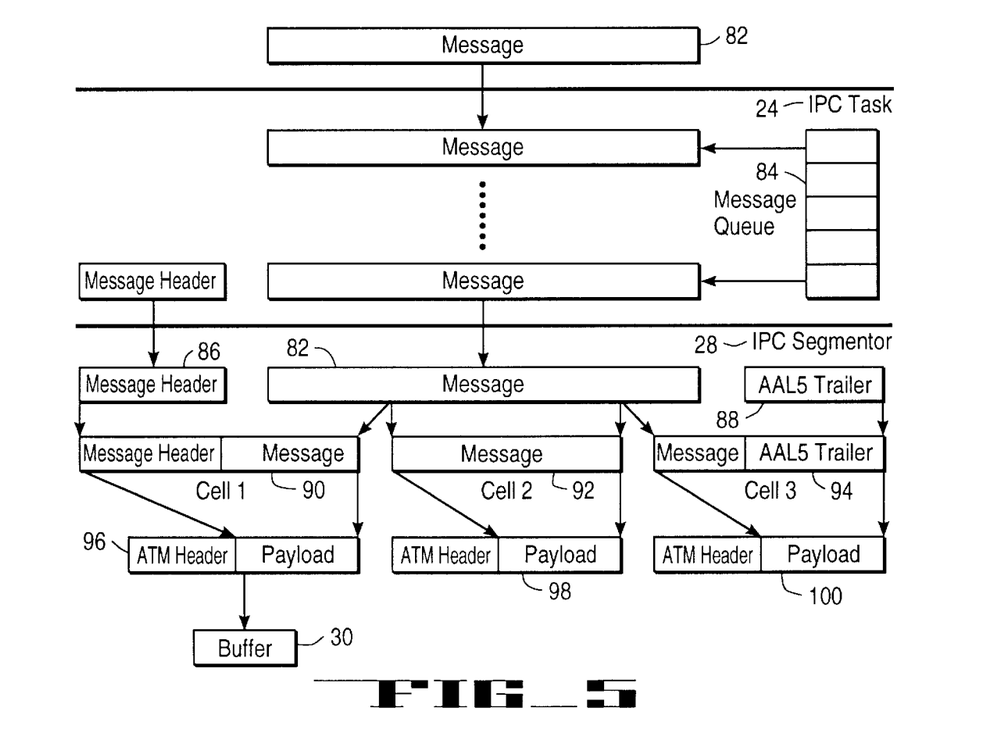
FIG. 5 is a schematical representation of an emulation of ATM segmentation carried out by the first processor in implementing the method of FIG. 3.

The implementation of steps 52, 54, 56 and 80 are shown schematically in FIG. 5. The first processor inputs a message 82 into a message queue 84 of the IPC transmit task described above. The message queue may include a number of messages waiting for transmission to the second processor 20. When a message is forwarded to the segmentor 28, the message is passed with an IPC message header 86 that contains the destination task ID.

In FIG. 5, the message header 86, the message 82, and an AAL5 trailer 88 form three 48-byte packets 90, 92 and 94. An ATM header is attached to each of the packets to form three 53-byte cells 96, 98 and 100. The three cells are transmitted to the cell buffer 30, one at a time.

A conventional first processing unit 14 of FIG. 1 does not generate an interrupt after all of the cells of a first message have been transmitted. Therefore, the segmentor of the IPC transmit task of the invention polls the first processing unit to determine when the processing unit is available to transmit the next cell. The segmentor waits until the entire CPCS-PDU has been transmitted. As previously noted, the first processing unit has an opportunity to transmit a cell in each internal cell cycle, so that the longest time that the segmentor waits before transmitting the next cell is one internal cell cycle (e.g., 2.4691 $\mu$s).

In FIG. 3, step 102 is the process step of passing the cells through the first processing unit 14 of FIG. 1. In step 104, the cells are forwarded to the SAR device 12 of FIGS. 1 and 2. In step 106, the message is reassembled from the cells. After the last part of the message has been reassembled, an interrupt is generated to signal the end of the message reassembly. The message is then passed 108 to a task for processing, using established techniques in the ATM environment.

Figure 6:
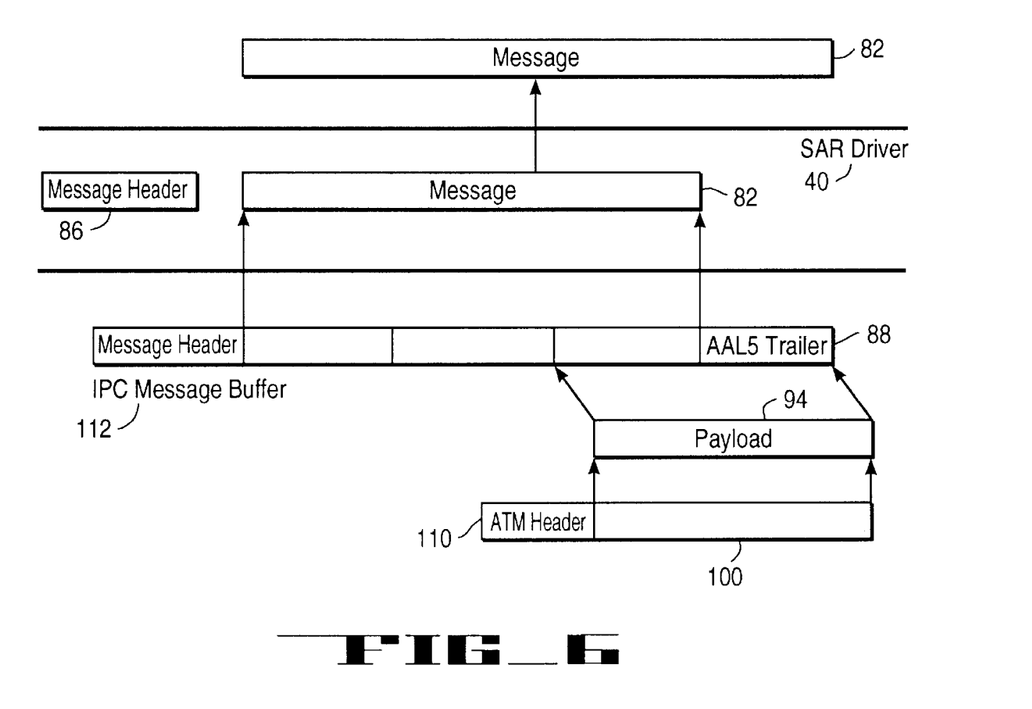
FIG. 6 is a schematical representation of the reassembly of a message that was segmented in FIG. 5.

The operation of reassembling the message is shown schematically in FIG. 6. As each of the three 53-byte cells described in FIG. 5 is received at the SAR device, the 5-byte ATM header is stripped from the payload. In FIG. 6, the last of the three ATM cells 100 described in FIG. 5 is received and the ATM header 110 is removed to reform the third 48-byte packet 94 of FIG. 5. This third packet is the one that contains the last portion of the message and all of the AAL5 trailer 88. This last packet is assembled with the two previously received packets within an IPC message buffer 112. The IPC message buffer is shown in FIG. 1, but is not critical to the invention.

After the cells have been reassembled, the AAL5 trailer 88 and the message header 86 are removed from the message 82. The SAR driver 40 then passes the message to the appropriate task.

Figure 7:
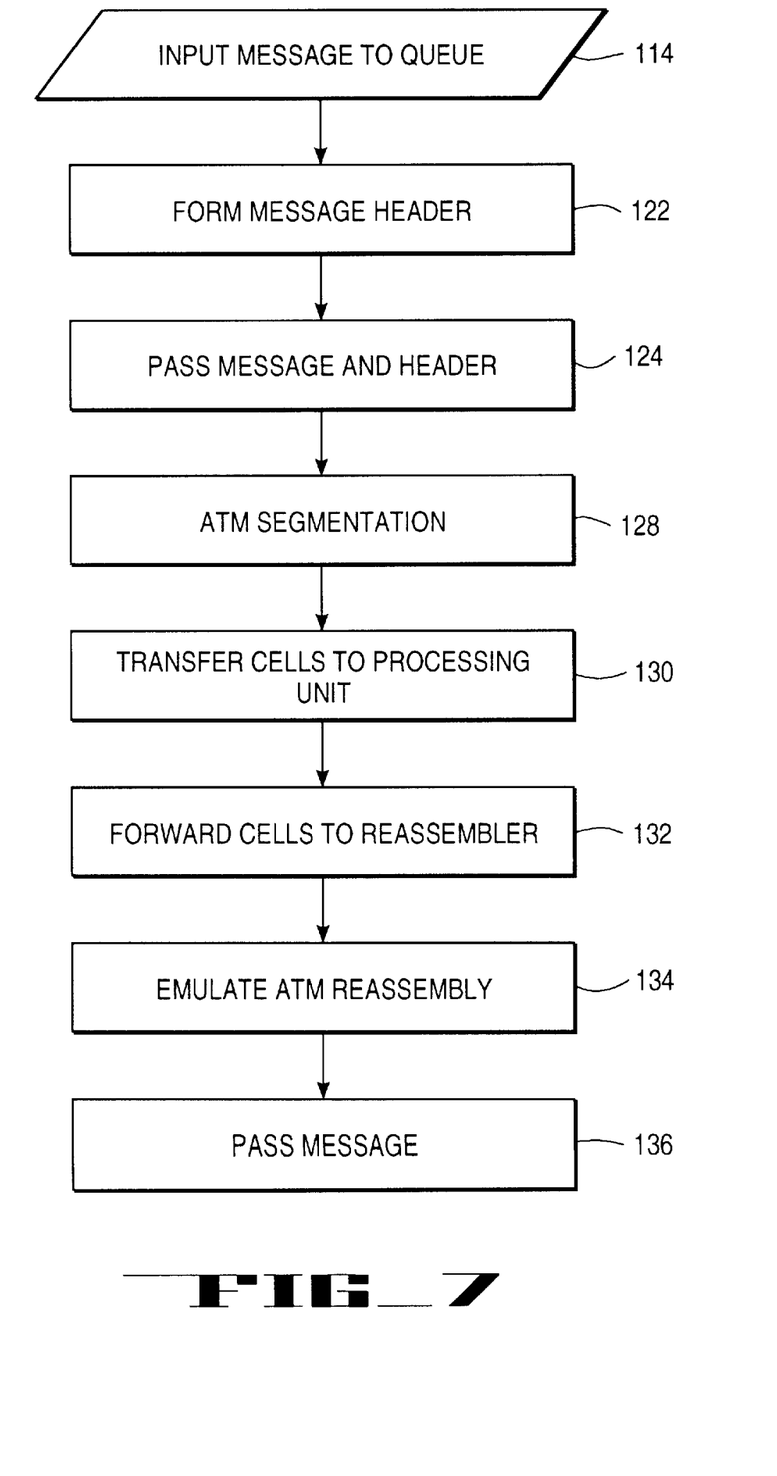
FIG. 7 is a process flow of steps implemented in carrying out an IPC from the second processor to the first processor in FIG. 1.
Figure 8:
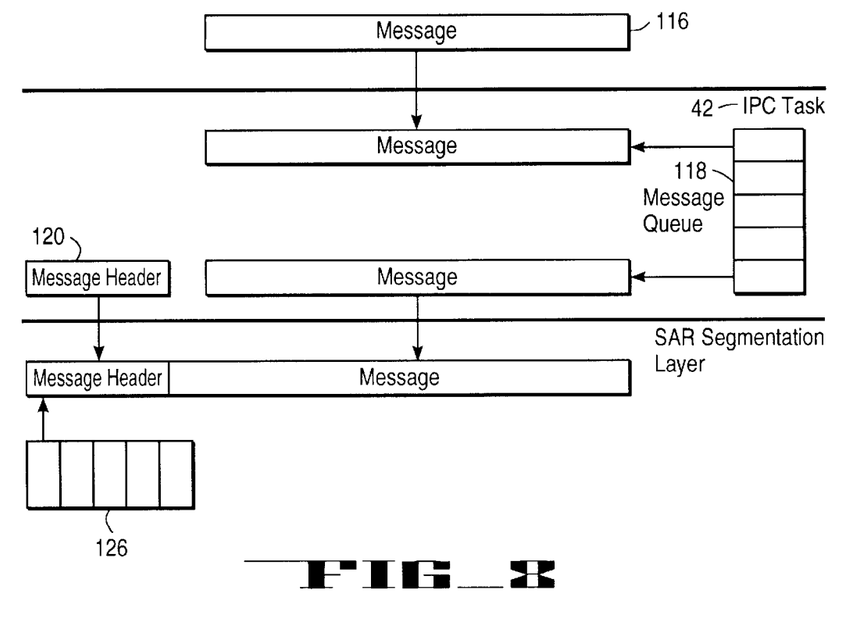
FIG. 8 is a schematical representation of the segmentation of a message during execution of the process of FIG. 7.
Figure 9:
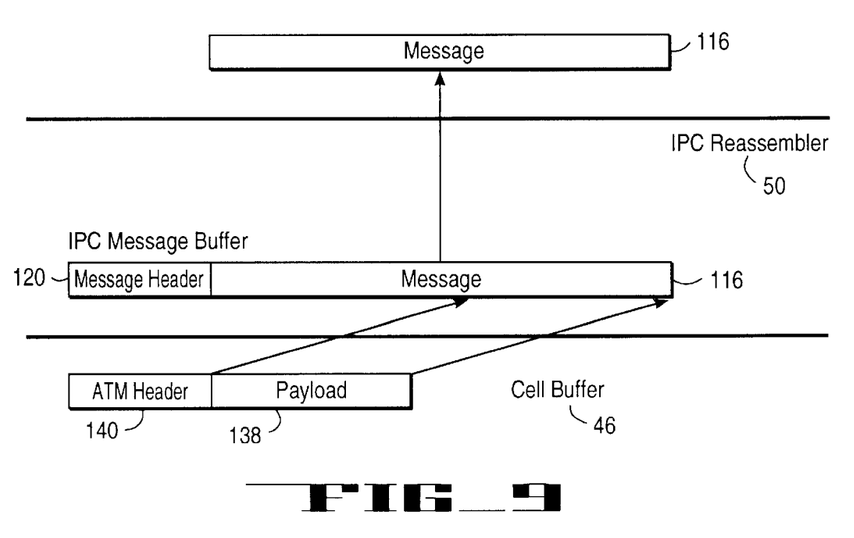
FIG. 9 is schematical representation of SAR reassembly of the message of FIG. 8.

The communication of a message from the second processor 20 to the first processor 22 will be described in detail with reference to FIGS. 7–9. A first step 114 is identical to the input step 52 of FIG. 3. That is, the processor inputs a message into a message queue of the associated IPC transmit task. In FIG. 8, a message 116 is input to the message queue 118 of the IPC task 42 described with reference to FIG. 2. A message header 120 is associated with the message prior to forwarding the message to the SAR device. The message header includes the destination task ID at the first processor. In FIG. 7, the message header is formed at step 122.

The message and the header are then passed 124 to the SAR device and copied into a SAR segmentation ring entry 126, as shown in FIG. 8. The SAR device segments the message into AAL cells with a pre-programmed ATM header. The ATM segmentation of step 128 is executed using known techniques.

The cells are then transferred to the second processing unit 16 of FIG. 1. This is shown at step 130 in FIG. 7. The second processing unit is programmed to capture the incoming cells having the predefined ATM header. Therefore, all of the cells having the appropriate VPI/VCI are forwarded to the cell buffer 46 of the second processing unit. As previously noted, the first processor 22 may have an operating speed that is less than the operating speed of the second processor 20, so that a traffic controller 48 may be necessary to avoid any overflow problems into the cell buffer 46. Thus, the step 130 of transferring cells to the processing unit includes a substep of regulating the transfer speed. After the entire IPC message has been segmented and sent to the processing unit, an interrupt is generated by the SAR device to signal the end of message segmentation.

The cells are then forwarded from the processing unit to the reassembler 50 of FIG. 2. This step is shown as 132 in FIG. 7. An interrupt is generated when a cell has been captured by the cell buffer of the second processing unit. The reassembler operates within an interrupt routine to check the AUU bit of the ATM header while reading the cell from the cell buffer. If the AUU bit is zero, the payload is copied into an IPC message buffer. On the other hand, if the AUU bit is one, the entire payload is concatenated into the message buffer other than the CPCS trailer. The CPCS trailer is copied into a CPCS trailer structure. If the length indicator and the CRC checking are correct, the entire message is passed to the data transfer layer for processing. Otherwise, the message is discarded. Because of the time-out mechanism used in the data transfer layer, the discarded message will be retransmitted.

The ATM reassembly is emulated at step 134 in FIG. 7. This step returns the IPC message to its original format for passage at step 136 to the appropriate task. Steps 132, 134 and 136 are shown schematically in FIG. 9. A last 53-byte cell 138 from the cell buffer 46 is forwarded to the IPC reassembler 50 for emulating ATM reassembly. The ATM header 140 is stripped from the payload of the last cell and the payload is combined with the payloads of the previously received cells to reform the message header 120 and the message 116 described with reference to FIG. 8. The message is then forwarded to the appropriate task.

While the invention has been described as utilizing the particular components shown in FIGS. 1 and 2, this is not critical to the implementation of the system and method. For example, a third processor having a software driver that enables emulation of SAR processing may be included. As another example, a conventional Universal Test and Operation Physical Interface (UTOPIA) may be included between the second processor 20 and the SAR device 12.

I claim:

1. A method of enabling intra-system communication between first and second processors of a local computing system having circuitry operatively associated with said second processor for supporting asynchronous transfer mode (ATM) segmentation and reassembly for said second processor, said circuitry being responsive to said second processor for communicating with remote computing systems using ATM transmissions, said method comprising steps of:

(a) with respect to a first message generated by and directed from said first processor for processing at said second processor, performing the following steps within said local computing system and without network transmissions:

(a1) emulating ATM segmentation at said first processor, thereby forming a plurality of first cells having payloads representative of said first message;

(a2) attaching ATM-compatible header information to each of said first cells;

(a3) transferring each first cell to said circuitry operatively associated with said second processor;

(a4) reassembling said first message, including utilizing said circuitry for concatenating said payloads and transferring said first message to said second processor;

(b) with respect to a second message generated by and directed from said second processor for processing at said first processor, performing the following steps within said local computing system and without network transmissions:

(b1) segmenting said second message at said circuitry to form second cells having payloads representative of said second message;

(b2) attaching ATM-compatible header information to each of said second cells;

(b3) transferring each second cell to said first processor; and (b4) emulating ATM reassembly of said second cells at said first processor, thereby forming said second message.

2. The method of claim 1 wherein said step (a1) of emulating ATM segmentation includes executing a segmentation task by said first processor such that said first cells are formed.

3. The method of claim 2 wherein said step (b4) of emulating ATM reassembly includes executing a reassembly task by said first processor such that said second message is accessible.

4. The method of claim 1 wherein said step (a4) of reassembling said first message and said step (b1) of segmenting said second message are each implemented at a segmentation and reassembly (SAR) device, said steps (a2) and (b2) of attaching ATM-compatible header information thereby forming fixed-length cells of 53 bytes.

5. The method of claim 4 wherein said step (b3) of transferring each second cell to said first processor includes forwarding said second cells via a cell processing device, said step (b2) of attaching ATM-compatible header information including establishing header information recognizable by said cell processing device as indicative of cells to be forwarded to said first processor.

6. The method of claim 1 further comprising a step of controlling a transfer rate during execution of one of said transferring steps (a3) or (b3) such that a difference in processing speeds of said first and second processor is accommodated.

7. The method of claim 1 wherein said steps (a1) and (b4) of emulating ATM segmentation and reassembly are implemented using computer software routines.

8. The method of claim 1 further comprising a step of forming each first and second message to include a message header having a task ID indicative of message processing to be executed after said steps (a4) and (b4) of reassembling cells.

9. A method of enabling message exchanges between first and second microprocessors integrated into a single computing device comprising steps of:

enabling intra-system ATM communications from said second microprocessor to said first microprocessor without network transmissions and enabling inter-system ATM communications with remote computing systems via an ATM network, including connecting a segmentation and reassembly (SAR) device to support segmenting messages from said second microprocessor into outgoing ATM cells and to support reassembling incoming ATM cells into a message to said second microprocessor; and enabling said first microprocessor to emulate ATM segmentation of outgoing messages to said second microprocessor into ATM cells directed to said SAR device and to emulate ATM reassembly of ATM cells received from said SAR device, said ATM cells being reassembled into intra-system messages from said second microprocessor.

10. The method of claim 9 wherein said step of enabling inter-system ATM communications includes connecting an interface to said SAR device such that ATM communications are enabled with said remote computing systems via said ATM network.

11. The method of claim 10 wherein said step of connecting said interface includes establishing said first microprocessor and said interface as alternative destinations for ATM cells from said SAR device.

12. The method of claim 9 wherein said step of enabling said first microprocessor includes providing computer programming to execute said segmentation and reassembly in software and includes limiting said segmentation and emulation by said first microprocessor to communications between said first and second microprocessors.

13. The method of claim 9 further comprising a step of establishing message header protocol for identifying ATM cells directed from said first microprocessor to said second microprocessor and for identifying ATM cells directed from said second microprocessor to said first microprocessor.

14. The method of claim 9 further comprising a step of retarding transmission speed of ATM cells from said SAR device to said first microprocessor to accommodate a slower processing speed of said first microprocessor.

15. A multi-processor computing system that supports ATM communications with remote systems via a network comprising:

a first microprocessor enabled to emulate ATM segmentation and reassembly of messages exchanged with a specific processing site within said system, said emulation being disabled for exchanges of messages with sites other than said specific processing site, said first microprocessor being an integrated circuit chip;

ATM circuitry that includes a message segmentation and reassembly (SAR) device for forming a plurality of cells in response to receiving an outgoing message and for forming a message in response to receiving a plurality of incoming cells, said first microprocessor being connected to said ATM circuitry for exchanging messages relating to said specific processing site in a form of cells which are restricted from transmission via said network; and a second microprocessor housed with said first microprocessor and connected to said ATM circuitry for directing outgoing messages to said SAR device for segmentation and for receiving messages assembled by said SAR device in response to receiving a plurality of incoming cells, said second microprocessor being said specific processing site and being cooperative with said first microprocessor to enable computer operations within said system, said second microprocessor being a second integrated circuit chip.

16. The system of claim 15 wherein a path between said first and second microprocessors includes only one said SAR device, said emulation of ATM segmentation and reassembly being computer software controlled and being transparent to said SAR device.

17. The system of claim 15 wherein said ATM circuitry is connected to input/output circuitry for exchanging ATM cells with remote devices.

18. The system of claim 15 wherein said first and second microprocessors have different processing speeds, said system further comprising a traffic control means for regulating the exchange of cells between said SAR device and said first microprocessor to accommodate said difference in processing speeds.

19. The system of claim 15 wherein said first microprocessor is programmed to attach ATM header information to each cell directed from said first microprocessor to said ATM circuitry.

* * * * *